United States Patent [19]
Crowell et al.

[11] 3,881,234
[45] May 6, 1975

[54] DEMOUNTABLE BEARING AND DRIVING MEMBER FOR RACK MOUNTED ROLLERS

[75] Inventors: John Arnold Crowell, Wilmington, Del.; Joel Leroy Vanover, Woodbury, N.J.

[73] Assignee: E. I. du Pont de Nemours & Company, Wilmington, Del.

[22] Filed: Apr. 10, 1974

[21] Appl. No.: 459,708

[52] U.S. Cl. ............................................. 29/115
[51] Int. Cl. .................................... B21b 13/02
[58] Field of Search.............. 29/115, 110, 129.5; 287/333, 356; 64/30; 100/172; 134/122

[56] References Cited
UNITED STATES PATENTS

| | | | |
|---|---|---|---|
| 826,944 | 7/1906 | Krieger | 403/356 |
| 1,325,260 | 12/1919 | Morris | 29/115 X |
| 2,081,583 | 5/1937 | Futchett | 29/115 X |
| 2,563,117 | 8/1951 | Hurley | 29/115 X |
| 2,566,449 | 9/1951 | Hornbostel | 29/115 X |
| 2,962,312 | 11/1960 | Wanner | 64/30 |
| 2,973,093 | 2/1961 | Erickson | 29/115 X |
| 3,324,791 | 6/1967 | Cassano et al. | 100/172 |
| 3,601,048 | 8/1971 | Beisel | 29/115 X |

FOREIGN PATENTS OR APPLICATIONS
412,563  1/1946  Italy ..................................... 29/115

*Primary Examiner*—Alfred R. Guest

[57] ABSTRACT

A film transport roller used in photographic processing equipment can be driven and coupled to a support frame by a gudgeon cooperating with a roll end socket mounted on the end of the roller. To couple the roller to the support frame the gudgeon is extended through the support frame and inserted into the roll end socket. The gudgeon has a male drive tang which mates with a female drive slot in the roll end socket to transfer torque. The gudgeon is readily removable from the roll end socket allowing the roller to be easily decoupled from the support frame. The gudgeon provides a radial bearing surface extending through the support frame. In addition, the gudgeon cooperates with the roll end socket to provide thrust bearing surfaces to reduce axial movement of the roller.

4 Claims, 5 Drawing Figures

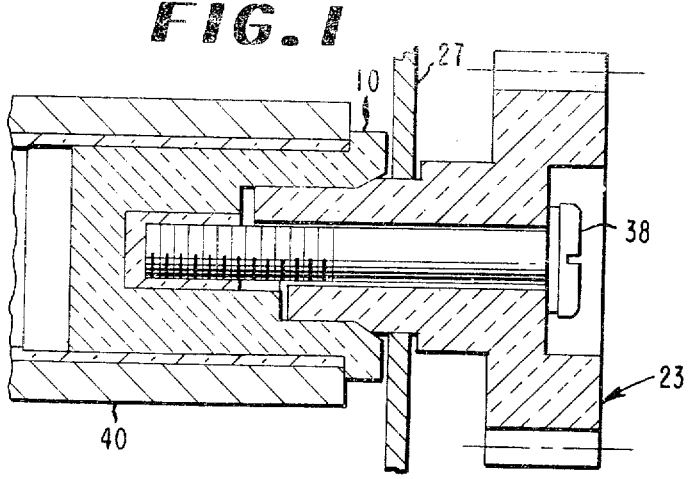
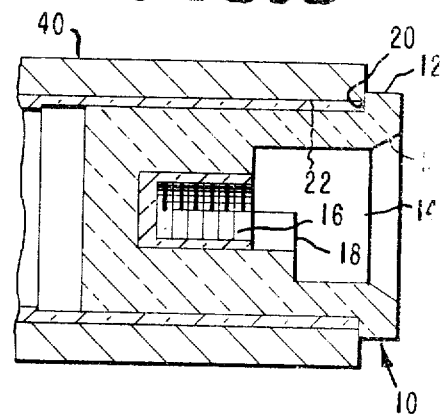
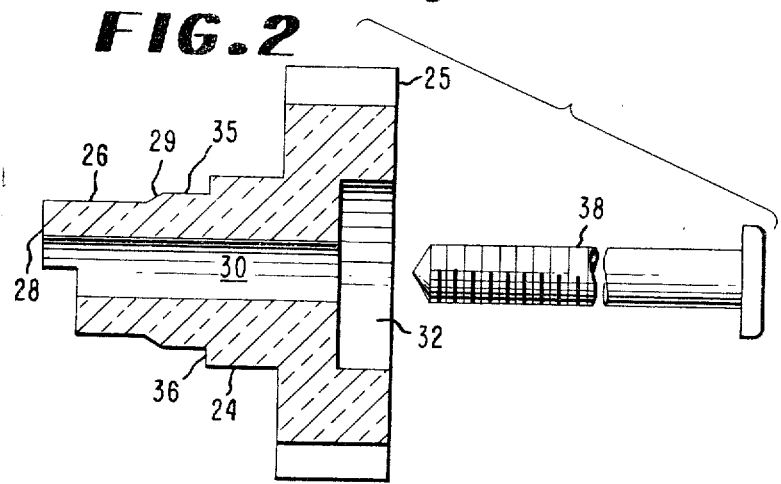
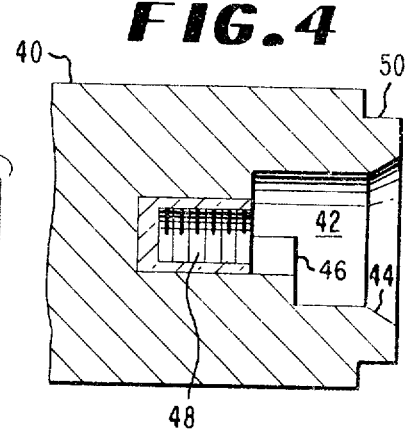
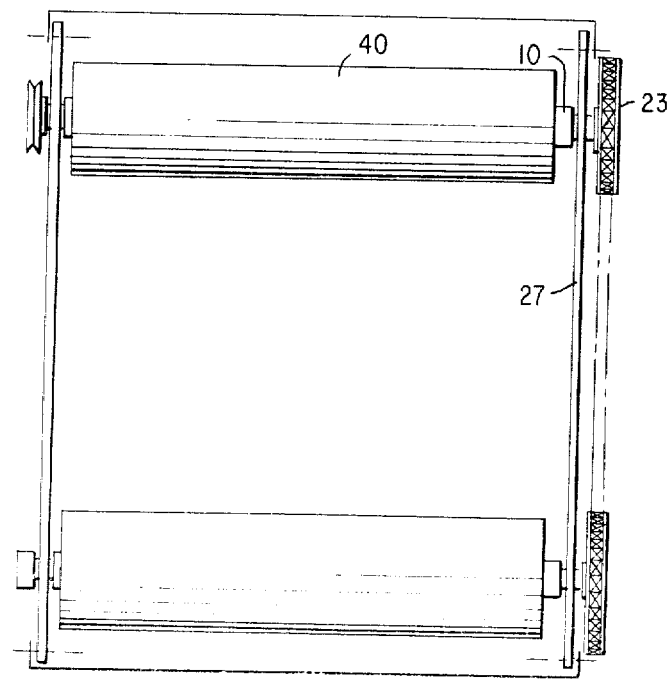

3,881,234

DEMOUNTABLE BEARING AND DRIVING MEMBER FOR RACK MOUNTED ROLLERS

BACKGROUND OF THE INVENTION

1. Field of the Invention

This invention relates to the art of driving a film transport roller and coupling it to a support frame. In particular, the invention relates to a roll end socket integral with the end of a roller and an integral driving member and gudgeon (hereinafter referred to as a gudgeon) which mates with the roll end socket to couple the roller to a support frame and provide torque to the roller.

2. Description of the Prior Art

In photographic film processors, a piece of film is automatically guided in a path by a multiplicity of rollers within a processing tank. In the prior art, the rollers are normally mounted in the support frame by cylindrical shafts in the ends of the roller which extend through bores in the support frame. The rollers are driven by gears or other driving devices attached to one or both ends of the roller. The driving device is usually demountable from the shaft for the dual reasons of allowing the roller to be mounted in the support frame and to allow substitution of the driving device when needed. Several U.S. patents illustrate the prior art.

U.S. Pat. No. 2,913,973 to G. C. Bull et al., shows one roller arrangement, where rollers are driven by a chain sprocket gear attached to the roller shaft with a cotter pin, with a shaft attached to the supporting frame through a block and bolt arrangement.

U.S. Pat. No. 3,324,791, to J. R. Cassano et al., shows an alternate approach, where the driving members are mounted on the shaft outside the supporting frame.

U.S. Pat. No. 826,944 to L. Krieger shows a still different approach to mounting gears on a shaft to strengthen the shaft when small diameter gears are used.

The above patent disclosures do not deal with several problems recognized in the art, one of which being that in order to replace a roller the whole support frame must be removed to free one side of the shaft and allow removal of the roller. The task is complex and cumbersome.

Another problem is that the presence of the driving devices on the roller side of the support frame may result in contamination of the processing solution or may enmesh an improperly inserted piece of film resulting in jamming of the processor and destruction of the film.

A further undesirable feature in conventional roller drives is that both radial and thrust bearing members are required to avoid axial and radial freedom of movement of the rollers, known as "play." Introduction of such bearings tends to increase the complexity of assembly and disassembly of the rollers for maintenance.

Still another problem occurs where a gear is slidably mounted on a shaft to allow for removal and replacement of the gear. There may be excessive play between the gear and shaft caused by wear or excessive manufacturing tolerances in the diameter of the shaft and bore in the gear. Manufacturing to close tolerances leads to added expense.

Custom made, commercially produced devices solve some but not all of these problems. One such device couples a roller to a support frame by a shaft removably press fitted into the end of the roller which extends through an opening in the support frame. A combination radial and thrust bearing fits around the inside of the opening of the support frame such that the shaft extends through it. A gear is secured near the end of the shaft on the outside of the support frame and is held in place by a head on the shaft.

Another commercial device has a plastic threaded screw extending through a support frame with a nut securing it to the support frame. The end of the screw has a shank extending beyond the threaded portion which extends into the roller to couple it to the support frame. A gear is secured to the end of the roll with the shank extending through it also. The roller and gear are both free to rotate about the shank.

SUMMARY OF THE INVENTION

The present invention overcomes the deficiencies of the prior art by providing novel apparatus for driving a roller and coupling it to a support frame. The apparatus comprises a roll end socket, a gudgeon, and a fastening member. The roll end socket mounted on the end of the roller has an elongated recess along the axis of the roller. A collar at the end of the roll end socket circumscribes the recess and forms a thrust bearing surface for contacting the surface of the support frame. A first torque transfer means is incorporated into the recess for transferring torque to the roller. A securing means is incorporated into the recess. The gudgeon is comprised of a torque transmitting shaft rotatably and removably mounted in the supporting frame and removable insertable into the elongated recess. The shaft has a bore along its axis and a second torque transfer means integral with the insertable end of the shaft for cooperating with and transferring torque to the first torque transfer means. Drive means mounted on the end of the shaft outside the support frame provide torque to the shaft. A thrust bearing surface integral with the drive means makes contact with the support frame. The fastening member extends through the bore in the shaft and is fastenable into the securing means of the roll end socket for fastening the driving member to the roll end socket.

The present invention operates to allow removal of an individual roller from the rack without disturbing the remaining rollers by the simple removal of the gudgeon from the roll end socket. The fact that one of the thrust bearings is fixedly mounted on the end of the roller eliminates the need for it to be mounted on the driving member shaft between the supporting frame and the roller. This allows the integral driving member and gudgeon to be removed without having to handle a loose thrust bearing on the shaft or remove a thrust bearing which is mounted on the shaft. This greatly simplifies cleaning, maintenance, or modification of the rollers in a support frame.

BRIEF DESCRIPTION OF THE DRAWINGS

For a better understanding of the present invention, reference is made to the accompanying drawings in which:

FIG. 1 is a sectional view of a gudgeon extending through a support frame and inserted into a roll end socket of a roller thus securing the roller to the support frame.

FIG. 2 is a sectional view of the gudgeon and the fastening member shown in FIG. 1.

FIG. 3 is a sectional view of the roll end socket in the roller assembly shown in FIG. 1.

FIG. 4 is a fragmentary sectional view of the end of a roller which has been machined to operate as a roll end socket.

FIG. 5 is a front elevation view of two rollers mounted in a support frame incorporating the features of the present invention.

DESCRIPTION OF THE PREFERRED EMBODIMENT

As illustrated in FIG. 3, the apparatus of this invention in the preferred embodiment includes a roll end socket 10 which is press fitted into bore 22 at the end of roller 40. The function of roll end socket 10 is to receive and secure a gudgeon (to be described subsequently) which will couple roller 40 to a support frame and provide torque to it. Roll end socket 10 is permanently secured in the end of roller 40 by an adhesive substance such as epoxy cement. Roll end socket 10 is cylindrical and preferably fabricated from a plastic material. An enlarged diameter collar 12 is formed at one end, and a cylindrical bore hereinafter referred to as recess 14, is formed along the horizontal axis. Recess 14 has one blind end and one open end. The surface of recess 14 at its open end may have a tapered edge 15 which tapers to a larger diameter than recess 14. At the blind end of recess 14 is a smaller diameter cylindrical bore which may be threaded or in a preferred embodiment may be a threaded cylindrical insert fixedly mounted within the smaller diameter bore. Such a threaded smaller diameter cylindrical bore, or threaded insert mounted within a bore will be hereinafter referred to as threaded insert 16. Between threaded insert 16 and the blind end of recess 14 is a female drive slot 18 (i.e., key slot or half cylinder). The surface of collar 12 making up the end of roll end socket 10 forms a thrust bearing surface 20.

FIG. 4 shows a modified roller having a machined portion at its end 40 which is used in place of roll end socket 10 described in FIG. 3. The machined portion has a machined collar 50 and a machined recess 42 extending through the collar and along the axis of roller 40. The machined recess has one blind end and may have a machined tapered edge 44 at its open end in the collar which expands outwardly to a larger diameter than machined recess 42 to allow for easier insertion of the gudgeon. The blind end of machined recess 42 has a machined female drive slot 46. Extending through machined female drive slot 46 is machined bore 48 which is threaded.

Referring now to FIG. 2 gudgeon 23 is insertable into roll end socket 10 illustrated in FIG. 3 to couple a roller to a support frame and provide torque to the roller. Gudgeon 23 includes spur gear 25 which has a collar 24 integral with its inner face. Collar 24 provides a thrust bearing surface 36. Shaft 26 of smaller diameter than collar 24 extends from collar 24 along the axis of gear 25 and collar 24. At a point partially along shaft 26, the shaft may taper down along tapered edge 29 with the remainder of the shaft having a smaller diameter. The larger diameter portion of the shaft provides a radial bearing surface 35 and the smaller diameter portion terminates with male drive tang 28 (i.e., a rectangular key or half cylinder). Axial bore 30 along the axis of gudgeon 23 allows fastening member 38, for example a machine screw, to be inserted and to be fastened to threaded insert 16 of roll end socket 10 illustrated in FIG. 3. Counter bore 32 in the outer face of spur gear 25 allows the head of fastening member 38 to be recessed to preserve space and protect the fastening member. The gudgeon, instead of using a spur gear, may also use a worm gear, bevel gear, helical gear, roller chain sprocket, ladder chain sprocket, belt pulley, timing belt pulley, noncircular gear, cam or other driving means.

FIG. 1 shows gudgeon 23 and roll end socket 10 operating in conjunction to couple roller 40 to support frame 27. Gudgeon 23 extends through support frame 27 and into roll end socket 10. The length of shaft 26 of gudgeon 23 is chosen so that when it is fully inserted into recess 14, tapered edge 15 of shaft 26 contacts tapered edge 29 of recess 14. There is enough space between thrust bearing surfaces 20 and 36 of roll end socket collar 12 and gudgeon collar 24, respectively, to accommodate the support frame 27. The surface of shaft 26 in this space will be the larger diameter portion 35 and will serve as a radial bearing surface to prevent radial movement. Tapered surfaces 15 of recess 14 and 29 of shaft 26 contact each other to center the gudgeon on the center line of the roller through the roll end socket and to prevent excessive movement or play of the shaft inside recess 14. It is therefore unnecessary to manufacture a close tolerance between the outer dimensions of shaft 26 and the inside dimensions of recess 14.

When shaft 26 is fully inserted into recess 14, male drive tang 28 at the end of shaft 26 mates with female drive slot 18 at the blind end of recess 14 to transfer torque from gudgeon 23 to roller 40. The male drive tang and female drive slot must mate in a manner which will not allow excessive play or gear lash. The drive tangs described use a key and slot combination or two mating half cylinders, however, other configurations may be used, for example, star or hexagonal couplings. In addition, keys along the side of the shaft may be used such as those shown in the aforementioned U.S. Pat. No. 826,944 or shown in U.S. Pat. No. 2,962,312 to K. W. Warner.

Axial bore 30 extends through spur gear 25, collar 24, shaft 26 and male drive tang 28. When gudgeon 23 is mated with roll end socket 10, a fastening member 38, such as a machine screw, may be extended through bore 30 and be removably fastened into threaded insert 16. The fastening member is not limited to being secured to roll end socket 10 by threads in threaded insert 16 but may be secured by a snap type locking device or any other locking device. Counterbore 32, illustrated in FIG. 2, allows the head of the fastening member to be recessed to preserve space and protect the fastening member.

While shaft 26 of driving member 23 is described as being cylindrical, such a shaft need not be cylindrical, but can be any shape provided there is a similarly shaped recess in the roll end socket to provide a mating member. Such a shape may be rectangular for instance, thus combining both the coupling and torque transmitting functions. Or it can be of polygonal cross section allowing indexing of the driving member with respect to the roller, and still provide torque transmission.

FIG. 5 shows a view of a processor roller transport frame with rollers and driving gears using the coupling described. Roller 40 is connected to support frame 27 by driving member 23 which extends through support frame 27 and into roll end socket 10.

We claim:

1. In apparatus for transporting film having at least one demountable roller secured in a supporting frame the improvement which comprises:

a roll end socket on the end of said roller having an elongated recess along the axis therein, a collar at the end of said roll end socket circumscribing said recess and forming a thrust bearing surface for contacting the surface of said supporting frame, a first torque transfer means incorporated in said recess for transferring torque to said roller, and a securing means, a unitary gudgeon having, a torque transmitting shaft rotatably and removably mounted in said supporting frame and removably insertable into the elongated recess of said roll end socket, said shaft having a bore along its axis, a second torque transfer means integral with the insertable end of said shaft for cooperating with and transferring torque to said first torque transfer means, a drive means mounted on the end of said shaft outside said supporting frame for providing torque to said shaft, a thrust bearing surface integrally affixed to said drive means between said drive means and said supporting frame for making contact with said supporting frame, and a fastening member extending through said bore in said shaft and fastenable into said securing means for fastening said gudgeon to said roll end socket.

2. The apparatus of claim 1 in which:

said elongated recess expands outwardly to a larger diameter at the end of said recess circumscribed by said collar to form a tapered surface, said shaft having a larger diameter portion connected by a tapered portion to a smaller diameter portion, whereby when said shaft is inserted into said recess said tapered edge of said recess mates with said tapered portion of said shaft to prevent radial movement of said shaft inside said recess.

3. The apparatus of claim 1 wherein:

said roll end socket is unitary and affixable to the end of said roller.

4. The apparatus of claim 1 wherein:

said roll end socket is integral with the end of said roller.

* * * * *